Dec. 20, 1960

A. ZACK 2,965,865

ELECTRICAL INDUCTOR

Filed Jan. 4, 1956

INVENTOR.
ALBERT ZACK

BY

Kenway, Jenney, Witter & Hildreth
ATTORNEYS

United States Patent Office 2,965,865

Patented Dec. 20, 1960

2,965,865

ELECTRICAL INDUCTOR

Albert Zack, Danvers, Mass., assignor, by mesne assignments, to Sylvania Electric Products Inc., Wilmington, Del., a corporation of Delaware Filed Jan. 4, 1956, Ser. No. 557,264

3 Claims. (Cl. 336—192)

This invention comprises a new and improved inductor so constructed and arranged as to facilitate mechanical handling in assembling operations. The invention also includes within its scope a novel package which is divisible into separate inductor units and thus affords a convenient means for distributing and handling the units.

In an effort to attain a certain degree of automation in the fabrication of electrical and electronic circuit components, it has been found that inductors such as transformers and peaking coils may be formed of spirally wrapped strips of conductive foil interleaved with one or more similarly wrapped strips of insulating material. If the strips of foil are very narrow, the spiral assembly is then necessarily very thin and may be termed a "wafer coil." The advantage inherent in this type of coil is that large numbers of such coils may be obtained by repeatedly slicing a cylindrical assembly built up by spirally winding comparatively wide sheets of conductive foil interleaved with sheets of insulating material of similar width. That is to say, automation of coil production can be facilitated by winding interleaved sheets of conductive material and insulating material on an arbor to form a substantially cylindrical assembly and then simply slicing the assembly in planes normal to its axis to form a large number of wafer coils. If desired, conductive strips or tabs to serve as terminals may be incorporated in the assembly during the winding process.

For purposes of illustration the present invention will be described as applied to inductors of the character above outlined, that is to say, inductors in the form of thin, substantially flat disks or wafer coils made up of spiral windings of conductive and insulating ribbon such, for example, as those described in detail in copending application Serial No. 543,726, filed October 31, 1955.

In preparing such an inductor for mechanical handling as stacking in magazines and feeding either vertically or horizontally to selected locations, it is proposed first to coat or encase the disk itself with a smooth protective shield or coating of wax, resin or plastic compound. The terminals of the coil as they emerge from this protective shell are located accurately in predetermined relation and provided with end portions shaped for connection with the conductive components of a circuit-carrying panel or other element of an electrical or electronic organization. Thus is provided a multiplicity of identical units ideally suited for use as above outlined.

In order further to facilitate mechanical handling of the inductor its coil may be encased in a shell of any desired shape moulded from suitable thermosetting or thermoplastic compound. For example it may be encased in a rectangular or square shell and the terminals of the coil maintained in parallel relation with end portions located side by side in predetermined position.

Alternatively the coil of the inductor may be attached to a stiff backing card and mounted in a frame which supplies the terminals as a part of its own structure.

In another aspect the present invention comprises a novel package which as herein shown may be made up of superposed sheets of protective material enclosing between them a multiplicity of thin, flat inductor disks, each disk having a pair of terminals extending therefrom in parallel relation and projecting substantially equal distances beyond the edge of the superposed sheets. The outer sheet or sheets of the package as herein shown are provided with scored marks or other means for indicating the lines of separation between the individual inductors.

These and other features of the invention will be best understood and appreciated from the following description of several preferred embodiments thereof selected for purposes of illustration and shown in the accompanying drawings, in which.

Figure 1:
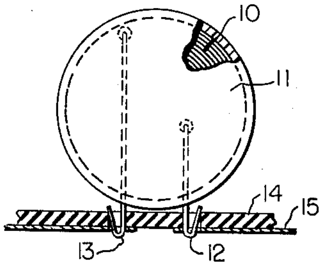
Figs. 1 and 2 are views in front and side elevation of a coated inductor showing its terminal connections to a circuit-carrying panel.
Figure 2:
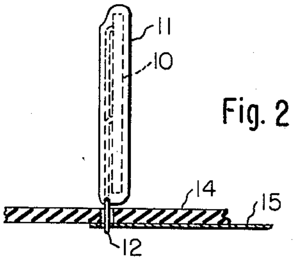

The inductor coil 10 shown in each of the accompanying figures and selected for purposes of illustration is constructed in accordance with the disclosure of the copending application above identified and comprises a ribbon of aluminum foil coiled with one or more ribbons of kraft paper impregnated with a co-polymer, thermo-setting, epoxy type of resin. The coil 10 is completely enclosed in a smooth shell 11 of protective material such as wax, resin, or suitable thermoplastic or thermosetting compound. The terminals 12 and 13, leading from the inner and outer ends of the metal ribbon, emerge from the shell 11 and are maintained in parallel relation. Each of the terminals has a resilient, hook-shaped end portion adapted to make connection with a panel 14 carrying a conductive circuit 15 which may be printed, deposited or otherwise arranged upon the panel. The hook-shaped ends of the terminals are preferably identical in dimensions and located side by side at the same level. Electrical connection with the circuit of the panel may be effected by merely passing the hook-shaped end portions of the terminals 12 and 13 through openings in the panel 14 and into engagement with the portion of the circuit adjacent the openings. It will be noted that the inductor coils thus prepared and protected may be readily stacked and mechanically handled as self-contained units. The shell 11 may be formed by dipping or otherwise coating the unit with the selected compound.

Figure 3:
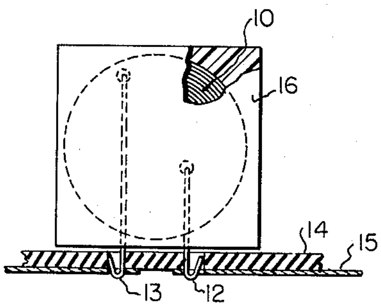
Figs. 3 and 4 are similar views of an encased inductor coil and panel connections.
Figure 4:
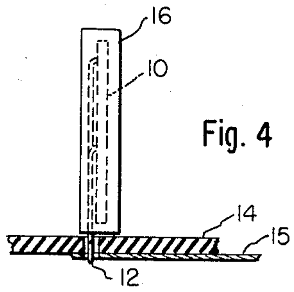

In Figs. 3 and 4 the inductor coil 10 is shown as encased within a shell 16 of square contour. The leads 12 and 13, as before, terminate in hook-shaped end portions and these are shown as making contact with the circuit 15 of the panel 14. The shell in this case may be molded from selected plastic compound with the coil embedded therein.

Figure 5:
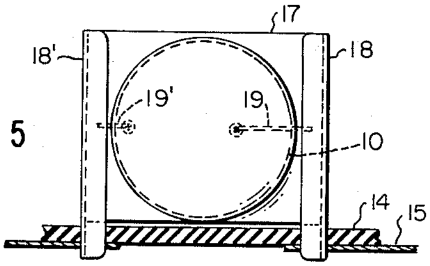
Figs. 5 and 6 are views in elevation and plan showing an inductor coil mounted in a frame, together with its panel connections.
Figure 6:
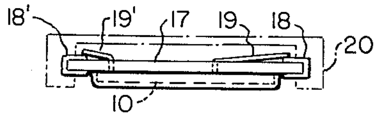

In Figs. 5 and 6 the inductor coil 10 is shown as adhesively attached to a stiff backing card 17 square in shape. The coil is mounted in a frame which includes in its structure a pair of vertical, metallic channels 18 and 18' and to these are respectively connected the terminals 19 and 19' of the coil. The metallic channels 18, 18' may be set in a rectangular frame 20 as indicated by dot and dash lines in Fig. 6, but either with or without the frame the coil 10 constitutes a self-contained and easily handled unit. The metallic channels 18, 18' constitute the terminals of the unit, having connection with the metal winding of the ribbon through the connections 19, 19'.

Figure 7:
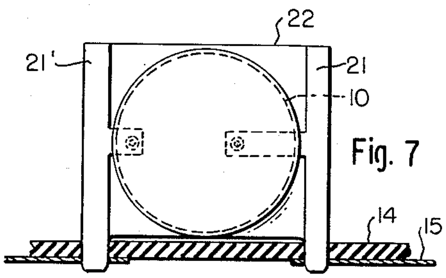
Figs. 7 and 8 are similar views showing a frame of somewhat different structure.
Figure 8:
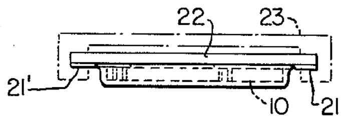

In Figs. 7 and 8 the coil 10 is shown as incorporated with a backing strip 22 to which are adhesively attached terminals 21, 21' in the form of metallic strips of ribbon. The inner and outer ends of the metal winding of the coil are connected respectively to these strips and the terminals themselves are maintained in parallel relation and predetermined location for connection with the channel circuit. The coil attached to its backing card 22 may be enclosed in a rectangular frame 23 as suggested in dot and dash lines in Fig. 8.

Figure 9:
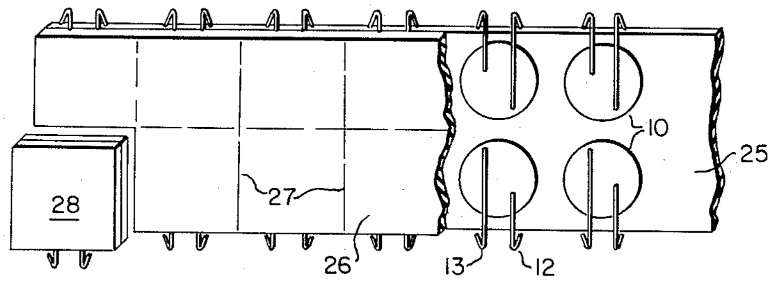
Fig. 9 is a view showing a multiplicity of inductor coils packaged for distribution.

In Fig. 9 is shown a package containing a multiplicity of inductor coils 10 that may be usefully employed in distributing and handling the coils. It comprises back and front sheets 25 and 26 of pasteboard or other fibrous material laminated with the coils 10 uniformly distributed and secured in position between them. The terminals 12 and 13 of the coils are arranged to extend as equally spaced pairs beyond the opposite edges of the strips. The strip 26 is shown as provided with scored marks 27 indicating lines of separation between the individual inductor coils and showing how the package may be cut up into separate units. One of these units 28 is shown as separated from the package.

I claim:

1. An inductor in the form of a thin flat disk comprising spiral windings of metallic ribbon and insulating material, a stiff backing card attached to the disk and a pair of lead members connected to the inner and outer ends of the metal ribbon and having free end portions disposed in substantially parallel relation and projecting equal distances beyond the backing card.

2. An inductor of the character described in claim 1 in which the backing card is enclosed at its edges within a rectangular frame.

3. An inductor comprising a thin flat disk containing a conductive circuit, a backing card attached to the disk, a rectangular frame enclosing the backing card and having at opposite edges channel shaped terminals extending beyond the backing card, and connections between the circuit of the disk and the terminals of the frame.

References Cited in the file of this patent

UNITED STATES PATENTS

| | | |
|---|---|---|
| Re. 20,564 | Salisberg | Nov. 30, 1937 |
| 1,357,128 | Travis | Oct. 26, 1920 |
| 1,597,901 | Kent | Aug. 31, 1926 |
| 1,714,326 | Snell | May 21, 1929 |
| 2,205,437 | Ringler | June 25, 1940 |
| 2,472,747 | Jones | June 7, 1949 |
| 2,707,272 | Blitz | Apr. 26, 1955 |
| 2,823,360 | Jones | Feb. 11, 1958 |

FOREIGN PATENTS

| | | |
|---|---|---|
| 143,116 | Australia | Aug. 29, 1951 |

OTHER REFERENCES

"Copper Foil Miniaturizes Coils," Electronic Equipment, pp. 12–14, March 1955.

"Wafer Coil Technique Mechanizes Production of Transformers," pp. 234–240, Electronics, December 1954.